UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF CEMENT.

SPECIFICATION forming part of Letters Patent No. 486,444, dated November 22, 1892.

Application filed January 4, 1892. Serial No. 416,987. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Cement, (Case No. 8,) of which the following is a full, clear, concise, and exact description.

My invention relates to a process and composition of matter used in the production of cement or paint, having magnesium as a basis, the object being to produce a cement or paint which possesses the quality of being proof against the attack of atmospheric and climatic influences.

The process and composition of matter of this my invention makes use of oxysulphate of magnesium, which as a basis of cement or artificial stone is not new in the art.

My invention, however, consists in providing an ingredient which when mixed with oxysulphate of magnesium produces cement or paint liquid stone which is not readily attacked by atmospheric or climatic influences.

My invention further consists in the process and composition of matter herein described, by which the substance forming the base of the cement or paint may be so combined into a solution and a powder that they may be transported to any desired point and mixed together at the place and time required, forming a plastic material, which may be used as a binding mixture for any inert substance or may be applied by means of a brush to wood, stone, brick, or other surfaces which it may be desired to protect. Coloring-pigments may be added to the mixture, giving the resulting product any desired color to produce any painted surface.

The process of my invention as I prefer to practice it is as follows: I procure an acid egg-albumen by taking four ounces of egg-albumen by dissolving it in twenty ounces of water. As this egg-albumen would at once coagulate if I should mix it with magnesium sulphate, it is necessary to render it non-coagulable. This is accomplished by acidifying the egg-albumen with dilute hydrochloric acid by the process of osmose, as if the acid were brought in direct contact with the egg-albumen the egg-albumen would be coagulated without being acidified. To this acid egg-albumen I add a solution of magnesium sulphate of at least 20° Baumé. The proportion of acid egg-albumen to the magnesium-sulphate solution may be varied within considerable limits. I preferably use from one to ten per cent. of acid egg-albumen to from ninety-nine to ninety per cent. of magnesium-sulphate solution. Magnesium oxide, with the coloring-pigment added thereto as may be desired, is added to this solution of magnesium sulphate and acid egg-albumen in proportion of fifty pounds of magnesium oxide to three gallons of solution. The resulting product will be a plastic mass, which may be made still more plastic or fluid, if desired, by adding water. This may be applied to surfaces by means of a brush, or it may be used by some inert substance as a binding material for the manufacture of artificial stone. When exposed to the atmosphere, it crystallizes and hardens into a compact stone covering of great strength and practically impervious to moisture. The time it will take to harden depends upon the temperature. The warmer the temperature the quicker the mass will become hard. It generally takes from four to twenty-four hours for the cement or paint to properly set. The proportions of the ingredients may be varied within considerable limits without serious detrimental results.

As the addition of magnesium oxide to the solution of magnesium sulphate and non-coagulable albumen cause the resulting mass to harden, I first make the solution of magnesium sulphate and non-coagulable albumen and add to the solution the magnesium oxide when it is desired to have the resulting cement or paint set.

Having thus described my invention, what I claim as new, and desire to secure by Letters Patent, is—

1. The process of making cement, which consists in mixing together non-coagulable albumen and a solution of magnesium sulphate and subsequently adding to the liquid mixture thus formed magnesium oxide, whereby a cement or paint is produced which is practically impervious to moisture, substantially as described.

2. The herein-described composition of matter for the production of cement or paint, consisting of the non-coagulable egg-albumen, magnesium sulphate, and magnesium oxide, in substantially the proportions specified.

3. The composition of matter herein described, consisting of non-coagulable egg-albumen, magnesium sulphate, magnesium oxide, and a suitable coloring-pigment, in substantially the proportions specified.

In witness whereof I hereunto subscribe my name this 2d day of January, A. D. 1892.

LOUIS ENRICHT.

Witnesses:
   CHARLES A. BROWN,
   GEORGE L. CRAGG.